US00RE36514E

United States Patent [19]

Clark

[11] E Patent Number: Re. 36,514

[45] **Reissued Date of Patent: *Jan. 18, 2000**

[54] POLE MOUNTED REVOLVING AIR CIRCULATING FAN

[75] Inventor: Michael L. Clark, South Fulton, Mo.

[73] Assignee: Honeywell, Inc., Southborough, Mass.

[ * ] Notice: This patent is subject to a terminal disclaimer.

[21] Appl. No.: 08/846,981

[22] Filed: Apr. 30, 1997

Related U.S. Patent Documents

Reissue of:

[64] Patent No.: 5,411,372
Issued: May 2, 1995
Appl. No.: 08/214,577
Filed: Mar. 18, 1994

[51] Int. Cl.[7] ..... F04D 29/36

[52] U.S. Cl. ..... 416/110; 416/108; 416/244 R; 416/246; 454/338

[58] Field of Search ..... 416/108, 109, 416/110, 113, 116, 244 R, 246; 454/230, 338; 248/157, 161, 282.1, 354.1, 354.4, 415, 416, 200.1

[56] References Cited

U.S. PATENT DOCUMENTS

| | | | |
|---|---|---|---|
| 2,213,873 | 9/1940 | Van Derschaegh | 416/110 |
| 2,231,620 | 2/1941 | Goldenberg | 416/110 |
| 2,830,779 | 4/1958 | Wentling | 416/244 R |
| 3,052,400 | 9/1962 | Holpfer | 416/110 |
| 5,558,501 | 9/1996 | Wang et al. | 416/244 R |

FOREIGN PATENT DOCUMENTS

| | | | |
|---|---|---|---|
| 614821 | 2/1961 | Canada | 248/354.4 |
| 403693 | 11/1909 | France | 416/108 |
| 1016484 | 11/1952 | France | 416/244 R |
| 1026476 | 3/1958 | Germany | 416/110 |
| 62-258190 | 11/1987 | Japan | 416/246 |
| 1-80796 | 3/1989 | Japan | 416/246 |
| 270542 | 5/1927 | United Kingdom | 248/161 |

*Primary Examiner*—Christopher Verdier
*Attorney, Agent, or Firm*—John E. Toupal; Harold G. Jarcho

[57] ABSTRACT

Disclosed is a new pole mounted revolving air circulating fan for inducing air movement within an air mass by use of a rotating impeller which simultaneously revolves around a vertical axis. The pole mounted revolving air circulating fan comprises a telescoping support pole extending substantially vertically upwardly from a mounting floor surface to a mounting ceiling surface, the ends of the support pole frictionally engaging the mounting surfaces. A fan, comprising a rotary air impeller coupled to an electric motor through a drive shaft, is revolvedly mounted on the vertical support pole. A generally cylindrical motor housing encloses the motor and the motor power supply leads. A blade guard, constructed of wire rods forming a substantially annularly shaped wire cage, encloses the impeller to prevent injury from contact therewith. The guard has a central hole through the back wherethrough the front end of the motor housing extends. The blade guard also has a bracket formed thereon adjacent the central hole whereby the blade guard is connected to the motor housing. A rotatable electrical contact assembly, having rotating wiper contacts cooperating with stationary ring contacts, allows power to be supplied to the fan motor while the fan is rotating around the vertical support pole. A manually actuated fan power switch, mounted on the support pole, completes or interrupts the electrical circuit to the fan motor thereby turning the device on or off. The fan is moved around the support pole with a rubber drive wheel coupled to the motor drive shaft, the drive wheel frictionally engaging a stationary rail which encircles the vertical support post whereby rotation of the drive wheel causes the fan to revolve around the post.

16 Claims, 3 Drawing Sheets

POLE MOUNTED REVOLVING AIR CIRCULATING FAN

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to air circulating devices and more particularly pertains to a pole mounted revolving air circulating fans which may be adapted for inducing air movement within an air mass by use of a rotating impeller which simultaneously revolves around a vertical axis.

2. Description of the Prior Art

The use of air circulating devices is known in the prior art. More specifically, air circulating devices heretofore devised and utilized for the purpose of inducing air movement are known to consist basically of familiar, expected and obvious structural configurations, notwithstanding the myriad of designs encompassed by the crowded prior art which have been developed for the fulfillment of countless objectives and requirements.

The present invention is directed to improving devices for inducing air movement within an air mass in a manner which is safe, secure, economical and aesthetically pleasing.

For example, U.S. Pat. No. 3,945,769 to Sanderson discloses a self-oscillating fan and U.S. Pat. No. 3,963,382 to Patton describes a portable air circulating fan.

The prior art also discloses an air circulating fan and motor with separable safety guard as shown in U.S. Pat. No. 4,022,548 to McLarty and a centrifugal fan for circulating room air of U.S. Pat. No. 4,061,441 to Mejia.

U.S. Pat. No. 4,946,399 to Kawashima describes a double-locking device for connector terminals and method of preparing the locking device. This is included for general interest.

While these devices fulfill their respective, particular objectives and requirements, the aforementioned patents do not disclose a pole mounted revolving air circulating fan for inducing air movement within an air mass by use of a rotating impeller which simultaneously revolves around a vertical axis.

In this respect, the pole mounted revolving air circulating fan according to the present invention substantially departs from the conventional concepts and designs of the prior art, and in so doing provides an apparatus primarily developed for the purpose of inducing air movement within an air mass by use of a rotating impeller which simultaneously revolves around a vertical axis.

Therefore, it can be appreciated that there exists a continuing need for new pole mounted revolving air circulating fans which can be used for inducing air movement within an air mass by use of a rotating impeller which simultaneously revolves around a vertical axis. In this regard, the present invention substantially fulfills this need.

As illustrated by the background art, efforts are continuously being made in an attempt to develop devices for inducing air movement. No prior effort, however, provides the benefits attendant with the present invention. Additionally, the prior patents and commercial techniques do not suggest the present invention combination of component elements arranged and configured as disclosed and claimed herein.

The present invention achieves its intended purposes, objects, and advantages through a new, useful and unobvious combination of method steps and component elements, with the use of a minimum number of functioning parts, at a reasonable cost to manufacture, and by employing only readily available materials.

SUMMARY OF THE INVENTION

In view of the foregoing disadvantages inherent in the known types of air circulating devices now present in the prior art, the present invention provides a new air circulating devices construction wherein the same can be utilized for inducing air movement within an air mass by use of a rotating impeller which simultaneously revolves around a vertical axis. As such, the general purpose of the present invention, which will be described subsequently in greater detail, is to provide a new pole mounted revolving air circulating fan apparatus and method which has all the advantages of the prior art air circulating devices and none of the disadvantages.

The invention is defined by the appended claims with the specific embodiment shown in the attached drawings. For the purpose of summarizing the invention, the invention may be incorporated into a new pole mounted resolving air circulating fan for inducing air movement within an air mass by use of a rotating impeller which simultaneously revolves around a vertical axis. The pole mounted resolving air circulating fan comprises a support pole extending substantially vertically upwardly from a mounting floor surface to a mounting ceiling surface. The support pole comprises a hollow round tube having a rigid wall, the wall having a first aperture therethrough proximal the upper end thereof, a second aperture intermediate the ends thereof, and a third aperture intermediate the first and second apertures. A planar foot is fixedly connected to the lower end of the tube, the foot frictionally engaging the floor surface. A telescoping extensible rod is longitudinally mounted to the upper end of the tube. The telescoping rod has locking means whereby longitudinal movement of the rod relative the tube may be prevented. The free end of the rod has a planar pad fixed connected thereto, the pad frictionally engaging the ceiling surface. The support pole also has manually actuated circuit switching means, including a set of toggling switch contacts. The switching means also includes terminal means operatively connected to the contacts. The switching means is fixedly mounted on the wall of the tube such that the terminal means extends inside the tube through the second aperture. Electrical power cord means, operatively connected at one end to a source of electrical energy, extends through the first aperture. The power cord means also extends downwardly inside the tube adjacent the switching means. The power cord means is operatively connected at the other end to the circuit switching terminal means.

A fan is revolvedly mounted on the vertical support pole. The fan comprises a rotary air impeller having a hub with a plurality of blades extending radially therefrom. The hub also has an axial hole therethrough whereto a drive shaft may be coupled. A generally cylindrical motor housing having a blunt front end and a substantially conical back end is included. An electric motor is mounted within the housing, the motor having electric power supply leads extending therefrom. The motor also has a longitudinal drive shaft projecting horizontally from both ends thereof, the shaft also projecting from both ends of the motor housing such that a first end of the shaft projects from the front end of the housing and a second end of the shaft projects from the back end of the housing. The first end of the shaft is fixedly connected to the axial hole through the impeller hub such that rotation of the shaft drives the impeller to induce movement in the surrounding air. A blade guard encloses the impeller to prevent injury from contact therewith. The blade guard is constructed of wire rods forming a substantially annularly shaped wire cage with essentially planar front and back ends. The ends are parallel with each other. The back end has a central hole therethrough wherethrough the front end of the motor housing extends such that the motor housing is partially enclosed within the blade guard. The blade guard also has bracket means formed thereon adjacent the central hole whereby the blade guard is connected to the motor housing. A slightly compressible rubber drive wheel is fixedly coaxially connected to the second end of the drive shaft.

A rotatable electrical contact assembly is mounted on the fan. The rotatable contact assembly comprises a contact housing integrally formed on the motor housing. The contact housing projects longitudinally rearwardly from the motor housing. The contact housing is a horizontally situated hollow, generally toroidal, structure with an open bottom radially connected to the motor housing. The contact housing is spaced below the rubber device wheel. An opening extends from inside the motor housing to inside the contact housing, the opening having the motor power supply leads passing therethrough. A rotary bushing, formed of rigid electrically insulating material, is fixedly coaxially mounted inside the contact housing. The bushing is also rotationally mounted on the exterior of the vertical support pole tube such that the bushing and attached fan may rotate freely about the support pole. The bushing has an integrally formed flat arm projecting radially outwardly therefrom. The arm is located inside the contact housing adjacent the opening to the motor housing. A pair of electrical wiper contacts, each having an electrical terminal connected thereto, is fixedly attached to the underside of the radial arm. The terminals extend upwardly, through the radial arm, to project slightly above the top of the radial arm. The terminals are each operatively connected to one of the motor power supply leads.

A stationary electrical contact assembly is mounted on the vertical support pole in cooperating relationship with the rotatable electrical contact assembly. The stationary electrical contact assembly comprises a round flange formed of rigid electrically insulating material. The flange has a central longitudinal hole therethrough encircling the vertical support pole tube. The flange is fixedly attached to the tube adjacent the third aperture such that the upper surface of the flange is in touching weight bearing relationship with the bottom surface of the rotary bushing whereby supporting the fan and rotatable contact assembly while simultaneously allowing the fan to revolve freely around the support pole. A pair of spaced apart concentric electrical contact tracks are concentrically mounted to the upper surface of the flange such that a track is contacted by a wiper to maintain electrical continuity regardless of the angular position of the rotatable contact assembly relative to the stationary contact assembly. Each contact track has terminal means extending therefrom, the terminal means also extending through the third aperture of the vertical support pole tube wall. The track terminal means is operatively connected to the power cord such that closing the switching means contacts allows electrical current to flow through the contact tracks to the wiper contacts then through the power supply leads to energize the motor.

A stationary rail encircles the vertical support post tube. The rail is in cooperative frictional contact with the rubber drive wheel of the fan whereby rotation of the drive wheel causes the fan and rotatable electrical contact assembly to revolve around the vertical support post.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. In as much as the foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the disclosed specific methods and structures may be readily utilized as a basis for modifying or designing other structures for carrying out the same purposes of the present invention. It should be realized by those skilled in the art that such equivalent methods and structures do not depart from the spirit and scope of the invention as set forth in the appended claims.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which the disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

Therefore, it is an object of the present invention to provide a pole mounted revolving air circulating fan for inducing air movement within an air mass by use of a rotating impeller which simultaneously revolves around a vertical axis.

It is another object of the present invention to provide a new pole mounted revolving air circulating fan which may be easily and efficiently manufactured and marketed.

It is a further object of the present invention to provide a new pole mounted revolving air circulating fan which is of a durable and reliable construction.

An even further object of the present invention is to provide a new pole mounted revolving air circulating fan which is susceptible of a low cost of manufacture with regard to both materials and labor, and which accordingly is then susceptible of low prices of sale to the consuming public, thereby making such pole mounted revolving air circulating fans economically available to the buying public.

Still yet another object of the present invention is to provide a new pole mounted revolving air circulating fan which provides in the apparatuses and methods of the prior art some of the advantages thereof, while simultaneously overcoming some of the disadvantages normally associated therewith.

Still yet another object of the present invention is to provide a new pole mounted revolving air circulating fan that offers improved safety over similar fans because the moving parts and electrically energized components are mounted well above the floor.

Yet another object of the present invention is to provide a new pole mounted revolving air circulating fan that occupies little floor space because of the single pole support structure.

Even still another object of the present invention is to provide a new pole mounted revolving air circulating fan that moves air more efficiently than similar fans because if revolves through a full 360° rather than merely oscillating across a narrow area.

These together with other objects of the invention, along with the various features of novelty which characterize the invention, are pointed out with particularity in the claims annexed to and forming part of this disclosure. For a better understanding of the invention, its operating advantages and the specific objects attained by its uses, reference should be had to the accompanying drawings and descriptive matter in which there is illustrated preferred embodiments of the invention. The foregoing has outlined some of the more pertinent objects of this invention. These objects should be construed to be merely illustrative of some of the more prominent features and applications of the present invention. Many other beneficial results can be attained by applying the disclosed invention in a different manner or by modifying the invention within the scope of the disclosure. Accordingly, other objects and a fuller understanding of the invention may be had by referring to the summary of the invention and the detailed description of the preferred embodiment in addition to the scope of the invention defined by the claims taken in conjunction with the accompanying drawings.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
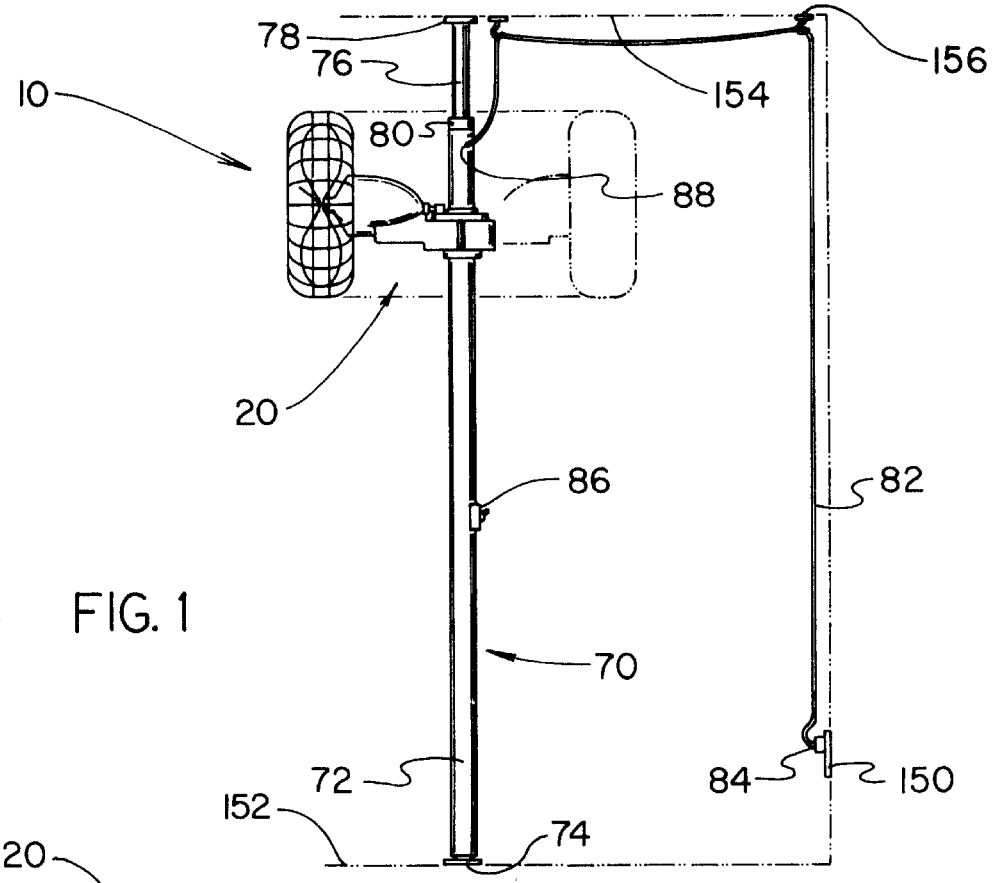
FIG. 1 is a side elevational view of the pole mounted revolving air circulating fan showing its manner of use.
Figure 2:
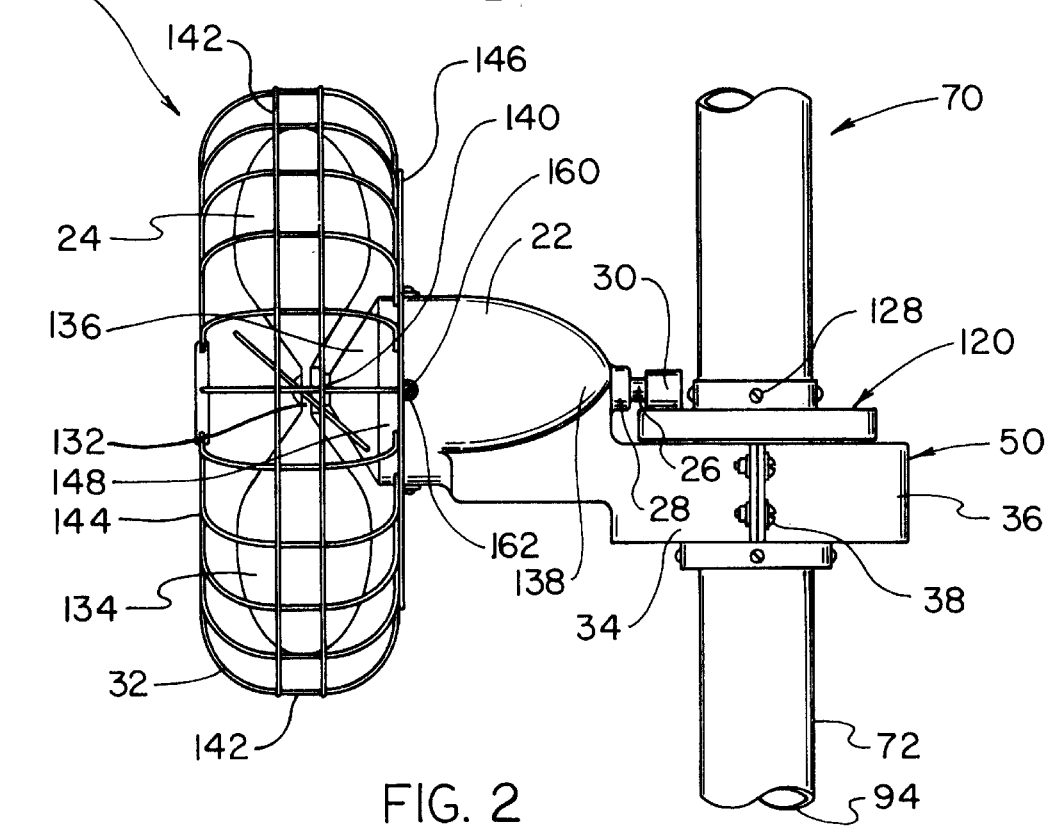
FIG. 2 is a detail view of the invention of FIG. 1 showing an enlarged side elevational view of the manner in which the fan is mounted to the pole.
Figure 3:
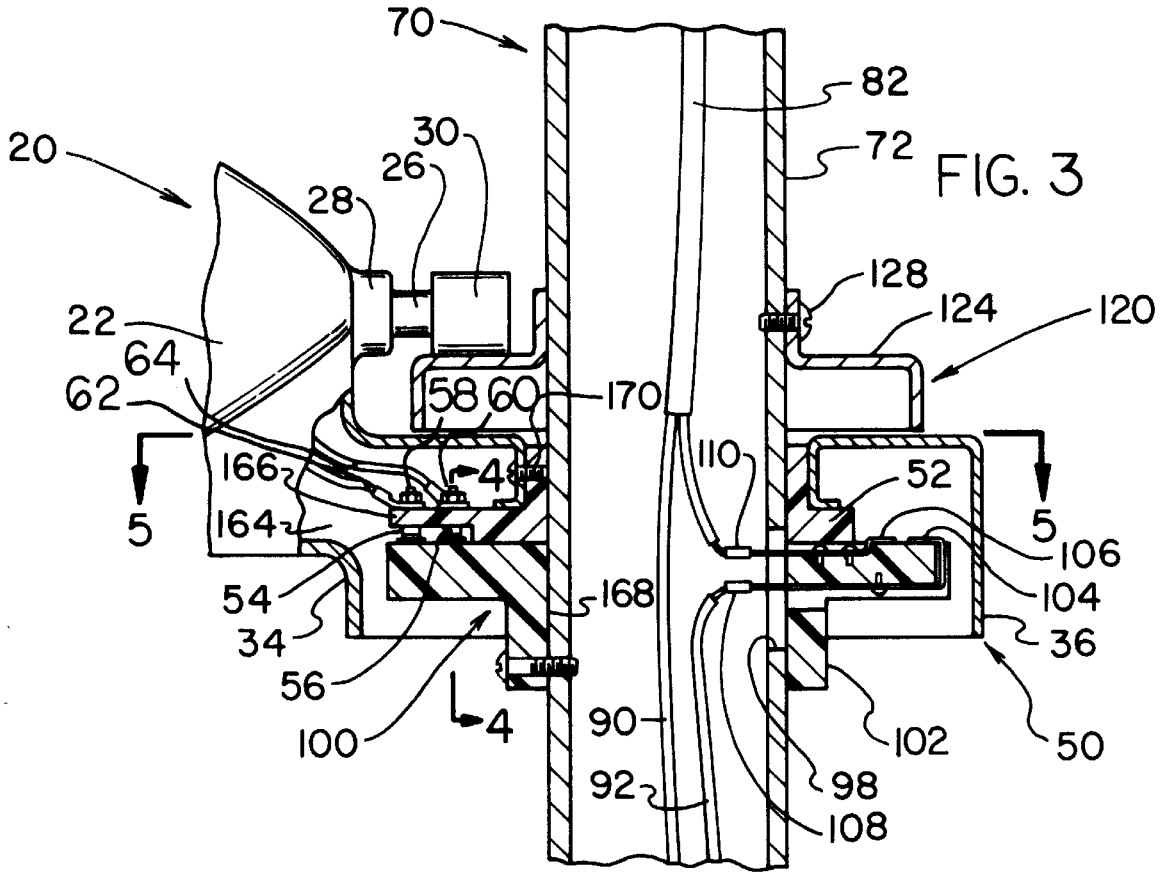
FIG. 3 is a partial cut away view of the present invention showing manner of construction of the fan mount and the rotating electrical contacts.
Figure 4:
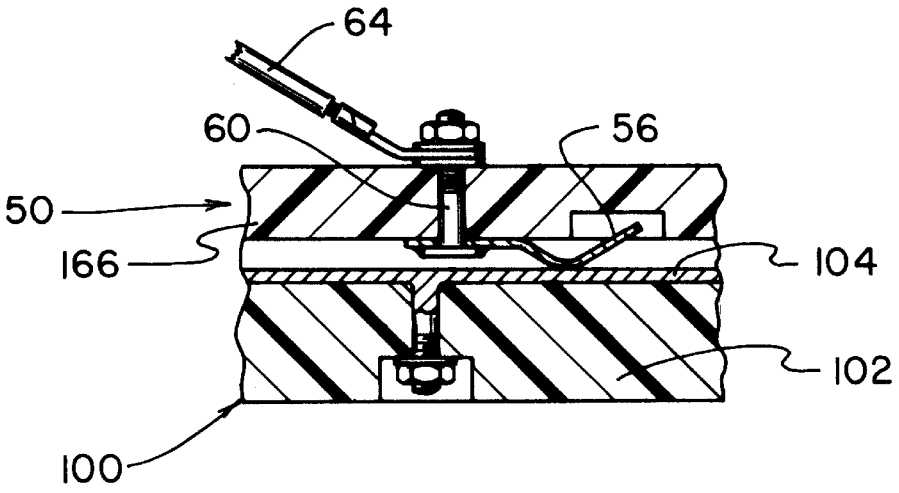
FIG. 4 is a sectional view of the invention of FIG. 3 taken along the line 4—4 and showing the manner of construction of the wiper and ring contacts.
Figure 5:
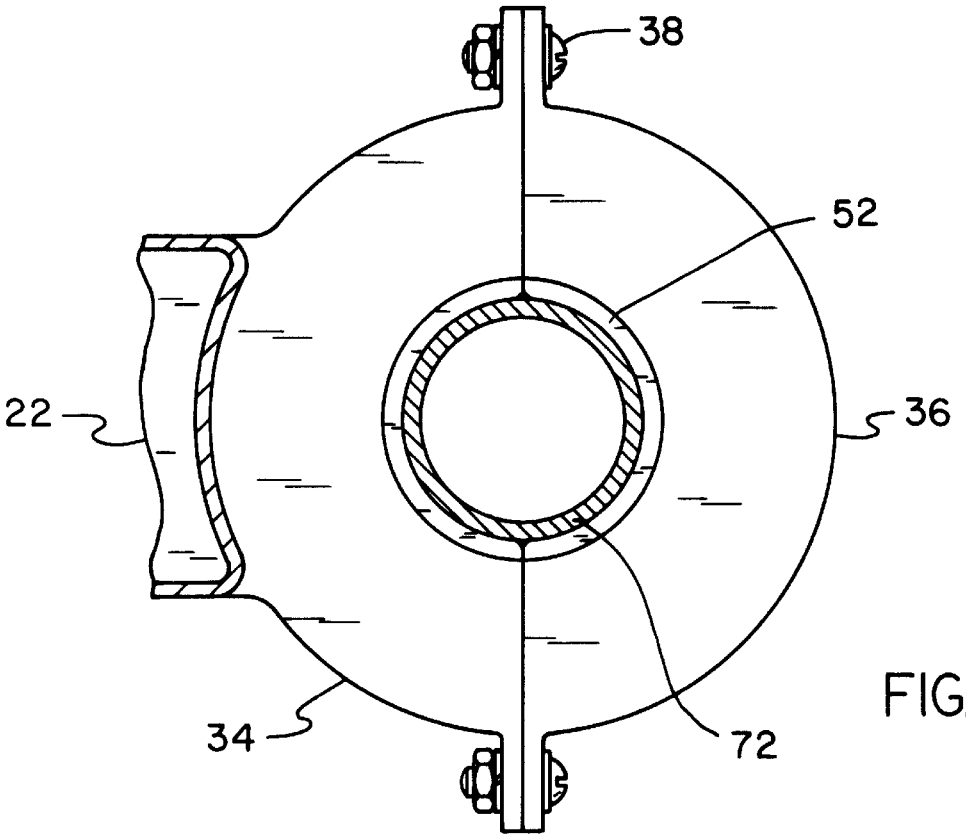
FIG. 5 is a sectional view of the invention of FIG. 3 taken along the line 5—5 and showing the preferred embodiment of the invention wherein the rotatable contact assembly housing is split for ease of assembly.
Figure 6:
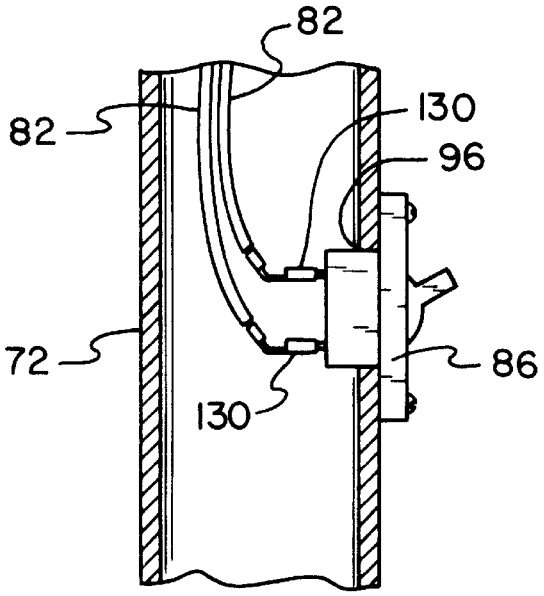
FIG. 6 is a partial cut away view of the present invention showing the manner in which the fan power switch is mounted on the support pole.

With reference now to the drawings, and in particular to FIG. 1 thereof, a new pole mounted revolving air circulating fan embodying the principles and concepts of the present invention and generally designated by the reference numeral 10 will be described.

From an overview standpoint, the pole mounted revolving air circulating fan is adapted for use for inducing air movement within an air mass by use of a rotating impeller which simultaneously revolves around a vertical axis. See FIG. 1.

With reference now to FIGS. 1–6 and more specifically, it will be noted that a new pole mounted revolving air circulating fan is shown. The pole mounted revolving air circulating fan 10 comprises a support pole 70 extending substantially vertically upwardly from a mounting floor surface 152 to a mounting ceiling surface 154. The support pole 70 comprises a hollow round tube 72 having a rigid wall 94, the wall having a first aperture 88 therethrough proximal the upper end thereof, a second aperture 96 intermediate the ends thereof, and a third aperture 98 intermediate the first and second apertures 88 and 96.

A planar foot 74 is fixedly connected to the lower end of the tube 72, the foot 74 frictionally engaging the floor surface 152. A telescoping extensible rod 76 is longitudinally mounted to the upper end of the tube 72. The telescoping rod 76 has a locking collet 80 whereby longitudinal movement of the rod 76 relative the tube 72 may be prevented. The free end of the rod has a planar pad 78 fixedly connected thereto, the pad 78 frictionally engaging the ceiling surface 154. The support pole 70 also has a manually fan power switch 86, including a set of toggling switch contacts. The switch 86 also includes terminals 130 operatively connected to the contacts.

The switch 86 is fixedly mounted on the wall 94 of the tube 72 such that the terminals 130 extend inside the tube 72 through the second aperture 96. An electrical power cord 82, operatively connected at one end to a wall receptacle 150 with a conventional electrical appliance plug 84, extends through the first aperture 88. The power cord 82 also extends downwardly inside the tube 72 adjacent the power switch 86. The power cord 82 is operatively connected at the other end to the power switch terminal means 130.

A fan 20 is revolvedly mounted on the vertical support pole 70. The fan 20 comprises a rotary air impeller 24 having a hub 132 with a plurality of blades 134 extending radially therefrom. The hub 132 also has an axial hole therethrough whereto a drive shaft may be coupled. A generally cylindrical motor housing 22 having a blunt front end 136 with a first shaft bushing 140 and a substantially conical back end 138 with a second shaft bushing 28 is included. An electric motor (not shown) is mounted within the housing 22, the motor having electric power supply leads 62 and 64 extending therefrom.

The motor also has a longitudinal drive shaft 26 projecting horizontally from both ends thereof, the shaft 26 also projecting from both ends 136 and 138 of the motor housing 22 such that a first end of the shaft extends through the first bushing 140 and a second end of the shaft extends through the second bushing 28. The first end of the shaft 26 is fixedly connected to the axial hole through the impeller hub 132 such that rotation of the shaft 26 drives the impeller 24 to induce movement in the surrounding air. A blade guard 32 encloses the impeller 24 to prevent injury from contact therewith. The blade guard 32 is constructed of wire rods 142 forming a substantially annularly shaped wire cage with essentially planar front 144 and back 146 ends. The ends are parallel with each other. The back end 146 has a central hole 148 therethrough wherethrough the front end 136 of the motor housing 22 extends such that the motor housing 22 is partially enclosed within the blade guard 32. The blade guard 32 also has bracket means 160 formed thereon adjacent the central hole 148 whereby the blade guard 32 is connected to the motor housing 22 with threaded fasteners 162. A slightly compressible rubber drive wheel 30 is fixedly coaxially connected to the second end of the drive shaft 26.

A rotatable electrical contact assembly 50 is mounted on the fan 20. The rotatable contact assembly 50 comprises a contact housing 34 integrally formed on the motor housing 22. The contact housing 34 projects longitudinally rearwardly from the motor housing 22. The contact housing 34 is a horizontally situated hollow, generally toroidal, structure with an open bottom radially connected to the motor housing 22. The contact housing 34 is separated laterally into two segments for ease of assembly on the pole 70, with the separable segment 36 being removably fastened to the housing 34 with threaded fasteners 38.

The contact housing 34 is spaced below the rubber drive wheel 30. An opening 164 extends from inside the motor housing 22 to inside the contact housing 34, the opening 164 having the motor power supply leads 62 and 64 passing therethrough. A rotary bushing 52, formed of rigid electrically insulating material, is fixedly coaxially mounted inside the contact housing 34 with threaded fasteners 170. The bushing 52 is also rotationally mounted on the exterior of the vertical support pole tube 72 such that the bushing 52 and attached fan 20 may rotate freely about the support pole 70. The bushing 52 has an integrally formed flat arm 166 projecting radially outwardly therefrom.

The arm 166 is located inside the contact housing 34 adjacent the opening 164 to the motor housing 22. A pair of electrical wiper contacts 54 and 56, each having an electrical terminal connected thereof 58 and 60, is fixedly attached to the underside of the radial arm 166. The terminals 58 and 60 extend upwardly, through the radial arm 166, to project slightly above the top of the radial arm. The terminals 58 and 60 are each operatively connected to one of the motor power supply leads 62 and 64.

A stationary electrical contact assembly 100 is mounted on the vertical support pole 70 in cooperating relationship with the rotatable electrical contact assembly 50. The stationary electrical contact assembly 100 comprises a round flange 102 formed of rigid electrically insulating material. The flange 102 has a central longitudinal hole 168 therethrough encircling the vertical support pole tube 72. The flange 102 is fixed attached to the tube 72 adjacent the third aperture 98 such that the upper surface of the flange 102 is in touching weight bearing relationship with the bottom surface of the rotary bushing 166 whereby supporting the fan 20 and rotatable contact assembly 50 while simultaneously allowing the fan 20 to revolve freely around the support pole 70.

A pair of spaced apart concentric electrical contact tracks 104 and 106 are concentrically mounted to the upper surface of the flange 102 such that a track 104 and 106 is contacted by a wiper 54 and 56 respectively, to maintain electrical continuity regardless of the angular position of the rotatable contact assembly 50 relative to the stationary contact assembly 100. Each contact track 104 and 106 has terminal means 110 and 108 extending therefrom, the terminal means 110 and 108 also extending through the third aperture 98 of the vertical support pole tube wall 94. The track terminal means 110 and 108 is operatively connected to the power cord 82 such that closing the power switch 86 contacts allows electrical current to flow through the contact tracks 104 and 106 to the wiper contacts 54 and 56 then through the power supply leads 62 and 64 to energize the motor.

A stationary circular rail 120 encircles the vertical support post tube 72, being fixedly connected to the tube 72 with threaded fasteners 128. The upper surface 124 of the rail is in cooperative frictional contact with the rubber drive wheel 30 of the fan 20 whereby rotation of the drive wheel 30 causes the fan 20 and rotatable electrical contact assembly 50 to revolve around the vertical support post 70.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention. In as much as the present disclosure includes that contained in the appended claims as well as that of the foregoing description. Although this invention has been described in its preferred forms with a certain degree of particularity, it is understood that the present disclosure of the preferred form has been made only by way of example and numerous changes in the details of construction and combination and arrangement of parts may be resorted to without departing from the spirit and scope of the invention.

Now that the invention has been described,

What is claimed is:

1. A pole mounted revolving air circulating fan for inducing air movement within an air mass by use of a rotating impeller which simultaneously revolves around a vertical axis, the pole mounted revolving air circulating fan comprising:

a support pole extending substantially vertically upwardly from a mounting floor surface to a mounting ceiling surface, the support pole comprising: a hollow round tube having a rigid wall, the wall having a first aperture therethrough proximal the upper end thereof, the wall additionally having a second aperture therethrough intermediate the ends thereof, the tube further having a third aperture therethrough intermediate the first and second apertures; a planar foot fixedly connected to the lower end of the tube, the foot frictionally engaging the floor surface; a telescoping extensible rod longitudinally mounted to the upper end of the tube, the telescoping rod having locking means whereby longitudinal movement of the rod relative the tube may be prevented, the free end of the rod having a planar pad fixedly connected thereto, the pad frictionally engaging the ceiling surface; manually actuated circuit switching means including a set of toggling switch contacts, the switching means also including terminal means operatively connected to the contacts, the switching means being fixedly mounted on the wall of the tube such that the terminal means extends inside the tube through the second aperture; electrical power cord means operatively connected at one end to a source of electrical energy, the power cord means extending through the first aperture, the power cord means also extending downwardly inside the tube adjacent the switching means, the power cord means being operatively connected at the other end to the circuit switching terminal means;

a fan comprising: a rotary air impeller having a hub with a plurality of blades extending radially therefrom, the hub also having an axial hole therethrough whereto a drive shaft may be coupled; a generally cylindrical motor housing, the housing having a blunt front end and a substantially conical back end; an electric motor mounted within the housing, the motor having electric power supply leads extending therefrom, the motor also having a longitudinal drive shaft projecting horizontally from both ends thereof, the shaft also projecting from both ends of the motor housing such that a first end of the shaft projects from the front end of the housing and a second end of the shaft projects from the back end of the housing, the first end of the shaft being fixedly connected to the axial hole through the impeller hub such that rotation of the shaft drives the impeller [to induce movement in the surrounding air]; a blade guard enclosing the impeller to prevent injury from contact [therewith] *with said impeller*, the blade guard being constructed of wire rods forming a substantially annularly shaped wire cage with essentially planar front and back ends, the ends being parallel with each other, the back end having a central hole therethrough wherethrough the front end of the motor housing extends such that the motor housing is partially enclosed within the blade guard, the blade guard having bracket means formed thereon adjacent the central hole whereby the blade guard is connected to the motor housing; a slightly compressible rubber drive wheel fixedly coaxially connected to the second end of the drive shaft;

a rotatable electrical contact assembly mounted on the fan comprising: a contact housing integrally formed on the motor housing, the contact housing projecting longitudinally rearwardly from the motor housing, the contact housing being a horizontally situated hollow generally toroidal structure with an open bottom radially connected to the motor housing spaced below the rubber drive wheel; an opening extending from inside the motor housing to inside the contact housing, the opening having the motor power supply leads passing therethrough; a rotary bushing formed of rigid electrically insulating material, the bushing being fixedly coaxially mounted inside the contact housing, the bushing also being rotationally mounted on the exterior of the vertical support pole tube such that the bushing and attached *air circulating* fan may rotate freely above the support pole, the bushing having an integrally formed flat arm projecting radially outwardly therefrom, the arm being located inside the contact housing adjacent the opening to the motor housing; a pair of electrical wiper contacts fixedly attached to the underside of the radial arm, the wiper contacts each having an electrical terminal fixedly connected thereto, the terminals extending upwardly through the radial arm to project slightly above the top of the radial arm, the terminals each being operatively connected to one of the motor power supply leads;

a stationary electrical contact assembly mounted on the vertical support pole in cooperating relationship with the rotatable electrical contact assembly, the stationary electrical contact assembly comprising: a round flange formed of rigid electrically insulating material, the flange having a central longitudinal hole therethrough encircling the vertical support pole tube, the flange being fixedly attached to the tube adjacent the third aperture such that the upper surface of the flange is in touching weight bearing relationship with the bottom surface of the rotary bushing whereby supporting the *air circulating* fan and rotatable contact assembly while simultaneously allowing the *air circulating* fan to revolve freely around the support pole; a pair of spaced apart concentric electrical contact tracks concentrically mounted to the upper surface of the flange such that a track is contacted by a wiper to maintain electrical continuity regardless of the angular position of the rotatable contact assembly relative to the stationary contact assembly, each contact track having terminal means extending therefrom, the terminal means also extending through the third aperture of the vertical support pole tube wall, the track terminal means being operatively connected to the power cord such that closing the switching means contacts allows electrical current to flow through the contact tracks to the wiper contacts then through the power supply leads to energize the motor; and a stationary rail coaxially encircling the vertical support post tube, the rail being in cooperative frictional contact with the rubber drive wheel of the *air circulating* fan whereby rotation of the drive wheel causes the fan and rotatable electrical contact assembly to revolve around the vertical support post.

2. [A pole mounted revolving] *An* air circulating fan *means* for inducing air movement within an air mass by use of a rotating impeller which [simultaneously revolves around] *moves about* a vertical axis, [the pole mounted] *said* air circulating fan *means* comprising:

a support pole extending substantially vertically upwardly from a mounting floor surface to a mounting ceiling surface, the ends of the support pole frictionally engaging the mounting surfaces [whereby] *thereby* wedging [the] *said support* pole in place to prevent unwanted movement [thereof] *of said support pole, said support pole including adjustment means for accommodating vertical adjustment of said support pole, and locking means for preventing said adjustment so as to maintain a selected length which facilitates frictional engagement of said support pole between the mounting floor and ceiling surface*;

an electric fan [revolvedly] *having a housing means rotatably* connected to [the vertical] *said* support pole such that [the] *said electrical* fan may [revolve around] *move in a path concentric to* the longitudinal axis of [the] *said support* pole; [and ]

*electro-mechanical* drive means [for moving the] *directly coupled between said housing means and said support pole and adapted to move said electrical* fan [around the vertical] *on said path concentric to the axis of said* support pole *without the assistance of air pressure produced by rotation of the fan; and*

[a rotatable electrical contact assembly mounted on the fan; and]

[a stationary] *an* electrical [contact] *supply* assembly mounted on [the vertical] *said* support pole, *and connected* to [the] *said electrical* fan, the [stationary] *electrical supply* assembly [cooperating with the rotatable electrical contact assembly to supply] *for supplying* electrical energy to [the] *said electrical* fan as it [revolves around] *moves in the path concentric to the axis of* [the vertical] *said* support pole.

[3. The pole mounted revolving air circulating fan of claim 2 wherein the vertical support pole comprises a hollow tube having a planar foot fixedly connected to the lower end thereof, the foot frictionally engaging the floor surface and a telescoping extensible rod longitudinally mounted to the upper end of the tube, the telescoping rod having locking means whereby longitudinal movement of the rod relative the tube may be prevented, the free end of the rod having a planar pad fixedly connected thereto, the pad frictionally engaging the ceiling surface.]

4. The [pole mounted revolving] air circulating fan *means* of claim [3] *17* wherein the vertical support pole further includes manually actuated circuit switching means including a set of toggling switch contacts, the switching means also including terminal means operatively connected to the contacts, the switching means being fixedly mounted on the tube.

5. The [pole mounted revolving] air circulating fan *means* of claim 4 and additionally including electrical power cord means operatively connected at one end to a source of electrical energy, the power cord means being operatively connected at the other end to the circuit switching terminal means.

6. The [pole mounted revolving] air circulating fan *means* of claim 5 wherein [the] *said electrical* fan comprises a rotary air impeller, a motor housing, an electric motor mounted within the housing, a longitudinal drive shaft projecting horizontally from both ends *of* the motor, the shaft also projecting from both ends of the motor housing, the shaft being fixedly connected at one end [to] *of* the impeller such that rotation of the shaft drives the impeller [for inducing movement in the surround air].

7. The [pole mounted revolving] air circulating fan *means* of claim 6 wherein the motor housing is generally cylindrically shaped, having a blunt front end and a substantially conical back end.

8. The [pole mounted revolving] air circulating fan *means* of claim 7 wherein the motor further includes electric power supply leads extending therefrom.

9. The [pole mounted revolving] air circulating fan *means* of claim 8 and further including a blade guard enclosing the impeller to prevent injury from contact [therewith] *with said impeller*.

10. The [pole mounted revolving] air circulating fan *means* of claim 9 wherein the blade guard comprises a substantially annularly shaped cage constructed of wire rods with essentially planar front and back ends, the ends being parallel with each other, the back end having a central hole therethrough wherethrough the front end of the motor housing extends, the blade guard also having bracket means formed thereon adjacent the central hole whereby the blade guard is connected to the motor housing.

11. The [pole mounted revolving] air circulating fan *means* of claim 10 wherein the drive means comprises a slightly compressible rubber drive wheel fixedly coaxially connected to the free end of the drive shaft, a stationary rail coaxially encircling the vertical support post tube, the stationary rail being in cooperative frictional contact with the rubber drive wheel whereby rotation of the drive wheel causes [the] *said electrical* fan to revolve around the vertical support post.

12. The [pole mounted revolving] air circulating fan *means* of claim 11 wherein the rotatable contact assembly comprises a contact housing integrally formed on the motor housing, a rotary bushing formed of rigid electrically insulating material fixedly coaxially mounted inside the contact housing, the bushing being rotationally mounted on the vertical support pole tube such that the bushing and attached *said electrical* fan may rotate freely about the support pole, the bushing having an integrally formed flat arm projecting radially outwardly [therefrom] *from said bushing and* located inside the contact housing, the bushing further having a pair of electrical wiper contacts fixedly attached to the underside of the radial arm, the wiper contacts each having an electrical terminal fixedly connected thereto, the terminals extending upwardly through the radial arm to project slightly above the top of the radial arm, the terminals each being operatively connected to one of the motor power supply leads.

13. The [pole mounted revolving] air circulating fan *means* of claim 12 wherein the stationary electrical contact assembly comprises a round flange formed of rigid electrically insulating material, the flange having a central longitudinal hole therethrough encircling the vertical support pole tube, the flange being fixedly attached to the tube such that the upper surface of the flange is in touching weight bearing relationship with the bottom surface of the rotary bushing whereby supporting [the] *said electrical* fan and rotatable contact assembly while simultaneously allowing [the] *said electrical* fan to revolve freely around the support pole, the stationary contact assembly also includes a pair of spaced apart concentric electrical contact tracks concentrically mounted to the upper surface of the flange such that a track is contacted by a wiper to maintain electrical continuity regardless of the angular position of the rotatable contact assembly relative to the stationary contact assembly, each contact track having terminal means extending therefrom, the track terminal means being operatively connected to the power cord such that closing the switching means contacts allows electrical current to flow through the contact tracks to the wiper contacts then through the power supply leads to energize the motor.

*14. The air circulating fan means of claim 2 wherein said pole comprises telescoping sections between said ends of said pole, and said locking means prevents telescoping movement between said sections.*

*15. The air circulating fan means of claim 14 including a planar foot fixedly connected to a lower end of said pole, and a planar pad fixedly connected to an upper end of said pole.*

*16. The air circulating fan means of claim 2 wherein said concentric path extends completely around said vertical support pole, and said electrical supply assembly comprises a rotatable electrical contact assembly mounted on said*

*electrical fan, and a stationary electrical contact assembly mounted on the vertical pole, the stationary contact assembly cooperating with the rotatable electrical contact assembly as said electric fan revolves around the vertical support pole.*

*17. The air circulating fan means of claim 16 wherein said support pole comprises a hollow tube, a telescoping extensible rod longitudinally mounted to an upper end of said tube, a planar foot fixedly connected to a lower end of said tube and engaging said floor surface, and a planar pad fixedly connected to an upper end of said pole and engaging said ceiling surface.*

* * * * *